United States Patent [19]
Stroze

[11] Patent Number: 4,836,693
[45] Date of Patent: Jun. 6, 1989

[54] INTERMITTENTLY ASSISTED HYDROSTATIC BEARING

[75] Inventor: Mark S. Stroze, Rockford, Ill.

[73] Assignee: Sundstrand Corp., Rockford, Ill.

[21] Appl. No.: 196,264

[22] Filed: May 20, 1988

[51] Int. Cl.[4] ............................................. F16C 32/06
[52] U.S. Cl. .................................. 384/121; 384/369; 384/448
[58] Field of Search ............... 384/121, 124, 107, 369, 384/399, 448, 12

[56] References Cited

U.S. PATENT DOCUMENTS

| | | |
|---|---|---|
| 611,984 | 10/1898 | Wright. |
| 3,181,638 | 5/1965 | Cockerell ........................ 180/7 |
| 3,266,854 | 11/1963 | Aller. |
| 3,271,086 | 9/1966 | Deffrenne. |
| 4,113,325 | 9/1978 | Miller. |
| 4,114,959 | 9/1978 | Christ. |
| 4,351,574 | 9/1982 | Furukawa et al.. |
| 4,368,930 | 1/1983 | Duchaine ........................ 384/121 |
| 4,568,203 | 2/1986 | Eddy ............................. 384/121 |
| 4,690,572 | 9/1987 | Sasaki ........................... 384/448 |

OTHER PUBLICATIONS

McGraw-Hill Encyclopedia of Science and Technology, Copyright 1971, vol. 2, pp. 127–128.

*Primary Examiner*—Lenard A. Footland
*Attorney, Agent, or Firm*—Antonelli, Terry & Wands

[57] ABSTRACT

An intermittently assisted hydrostatic bearing (10) for a hydraulic apparatus having a rotatable surface which is periodically assisted from a pressure balance of less than 100% to a pressure balance greater than 100% pressure balance includes a pressurized fluid supply source (28) for supplying a pressurized fluid, a supply channel (30, 31, 32 and 34) for supplying pressurized fluid from the pressurized fluid supply source to a point (36) between cooperating opposed bearing surfaces (24) and a pressure producing device (48) which communicates with the fluid supply channel and in response to a command signal causes the hydrostatic bearing to attain a greater than 100% pressure balance. The invention further includes a check valve (60) positioned in the supply channel (32) to prevent the reverse flow of fluid into the pressurized fluid supply source (28).

21 Claims, 1 Drawing Sheet

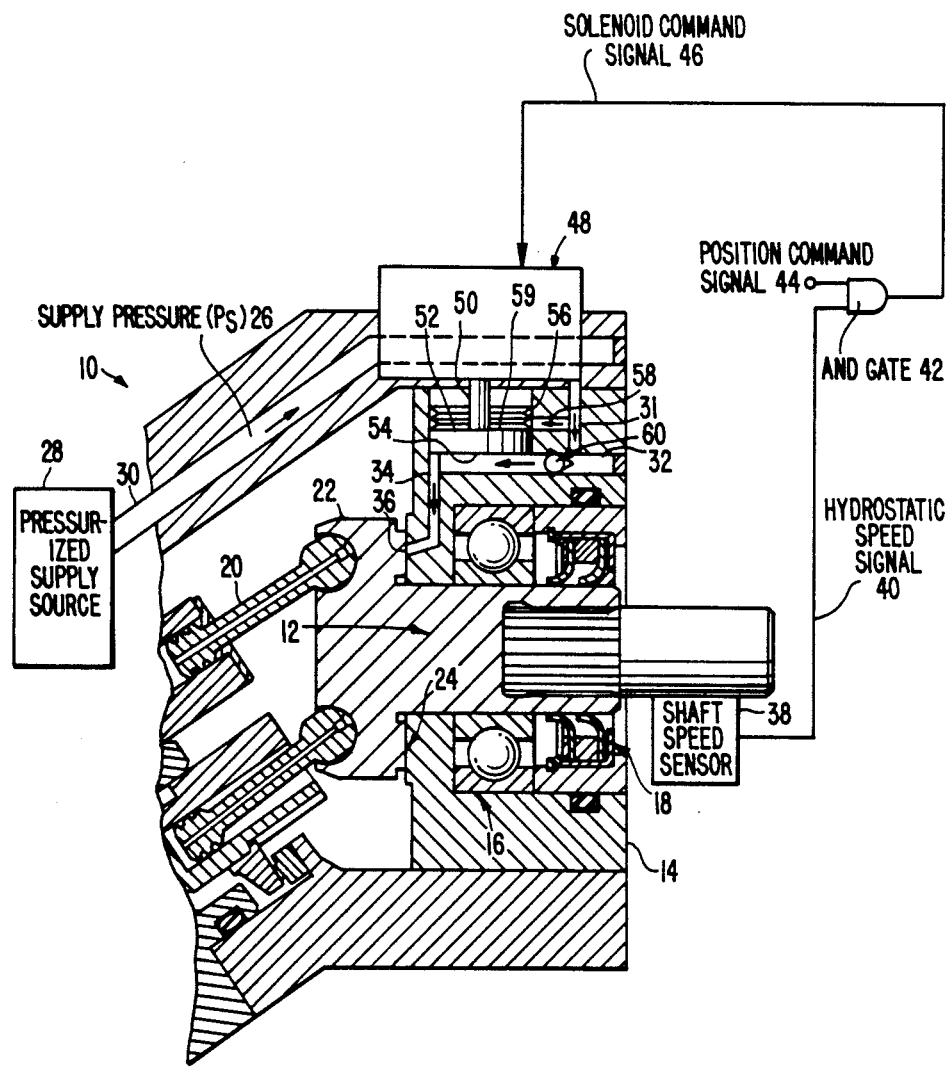

INTERMITTENTLY ASSISTED HYDROSTATIC BEARING

TECHNICAL FIELD

The present invention relates to hydrostatic bearings used for supporting a rotating member in applications where rotational velocity is not always sufficient to provide a hydrodynamic bearing. More particularly, the present invention relates to an intermittently assisted hydrostatic bearing which is periodically assisted to provide complete separation of the rotating member from the bearing during zero or low rotational speeds which are insufficient to establish hydrodynamic operation.

BACKGROUND ART

A hydrostatic bearing uses a source of pressurized oil between surfaces to suspend the surfaces from each other to avoid frictional contact. Correct proportioning of the oil pressure and the quantity of the oil flow permits the surfaces to be suspended whether they are moving or not. See volume 2 *McGraw-Hill Encyclopedia of Science and Technology*, Copyright 1971 pages 127 and 128.

A hydrodynamic bearing relies upon relative motion between surfaces to self generate fluid pressure in fluid disposed between the surfaces to separate the surfaces from each other to avoid frictional contact. See *McGraw-Hill Encyclopedia of Science and Technology*, Copyright 1971 page 127.

The application of a hydrostatic bearing to a hydraulic motor or pump involves a compromise between leakage and friction, primarily at zero or low rotational speeds. The leakage and friction of a hydrostatic bearing is related to the percent of pressure balance of the bearing. Pressure balance provides a measure of the percentage of the load supported by the pressurized fluid of the hydrostatic bearing. For example, 97% pressure balance means 97% of the load is supported by the pressurized fluid and 3% of the load is supported by the physical bearing structure. A pressure balance of greater than 100% means that the load is more than 100% supported by the film.

One approach in applying a hydrostatic bearing in a hydraulic motor or pump is to use a greater than 100% pressure balance. A greater than 100% pressure balance results in a more rapid formation of a fluid film under all rotational conditions thereby permitting nearly immediate operation of the bearing in a hydrodynamic state. Therefore, extremely low friction values exist at start up and low speeds. However, leakage of the fluid is increased. Increases in leakage of the fluid translates into decreases in moter volumetric efficiency and higher heat production.

The use of less than 100% pressure balance is advantageous in that leakage is reduced, but the resultant increase in breakout and low speed friction may be unacceptable. Typically, a hydrodynamic feature is designed into bearings to support the rotating member by a pressurized fluid film generated by rotation once a high rotating speed is attained.

Hydraulic motors used in devices such as, for example, control surfaces for an Advance Tactical Fighter (ATF) must preload the control surfaces and move the control surfaces at high frequency. A hydraulic motor used in an ATF for moving and preloading the control surfaces is cycled such that it reverses directions numerous times a second, for example, 20 Hz.

Various devices have been proposed for prviding a hydrostatic bearing which is periodically assisted to a greater than 100% pressure balance. One example of such a device is an add on unit having an oil accumulator which stores pressurized oil for use with the crankshaft bearings of an engine. A valve on the accumulator is opened manually to vent the pressurized oil in the accumulator to the crankshaft bearings to obtain a greater than 100% pressure balance prior to and during start up, when the oil pump has not generated sufficient pressure to fully pressurize the crankshaft bearings. This device suffers from various disadvantages, namely that manual operation is required and cannot be used in applications where periodic and rapid initiation of the greater than 100% pressure balance is required.

In electric power generators hydrostatic bearings are provided to reduce friction during start up of the generators.

U.S. Pat. Nos. 611,984, 4,113,325, 4,114,959, and 4,351,574 disclose fluid bearings.

DISCLOSURE OF INVENTION

The present invention overcomes the above described disadvantages by providing a hydrostatic bearing which is intermittently assisted to obtain a greater than 100% pressure balance during the zero and low speed conditions of a hydraulic apparatus. The invention may be used in diverse applications such as but not limited to hydraulic pumps and motors.

The intermittently assisted hydrostatic bearing of the invention is periodically assisted from less than 100% pressure balance in response to a command signal to attain a greater than 100% pressure balance.

Controlled operation between less than and greater than 100% pressure balance is the desired compromise. Greater than 100% pressure balancing is needed at start up and low speeds to reduce friction, while less than 100% pressure balancing is desired to control leakage when the motor idles under pressure for long periods and at higher speeds when the formation of a hydrodynamic film is possible. The hydraulic apparatus includes a rotating member and a stationary support member with the members having cooperating opposed bearing surfaces thereon. The hydrostatic bearing of the present invention includes a pressurized fluid supply source for supplying a pressurized fluid and a supply channel for supplying the pressurized fluid from the pressurized fluid supply source to a point between the cooperating opposed bearing surfaces.

The present invention also includes a pressure producing device which includes an electric solenoid having its shaft connected to a displacing piston. The pressure producing device communicatse with the supply channel and in response to a command signal translates the displacing piston thereby causing the hydrostatic bearing to increase from less than 100% to greater than 100% pressure balance by increasing the pressure of the pressurized fluid which is supplied to a point between the cooperating opposed bearing surfaces. The greater than 100% pressure balance readily creates a fluid film upon which said rotating member floats to reduce friction at the cooperating opposed bearing surfaces and permit the rapid establishment of a hydrodynamic bearing.

The pressure producing device operates in response to a command signal which is generated by an AND gate when a position command signal is present on one input of the AND gate and a signal indicating that the rotational speed of the rotating member is less than that needed to establish a hydrodynamic condition is present on the other input of the AND gate. The position command signal is related to the position of the rotating member.

Further, a surface of the displacing piston serves as a wall of the supply channel. The displacing piston is biased against the force created by the pressurized fluid pushing against the surface of the displacing piston serving as a wall of the supply channel by a spring.

A checkvalve is provided in the supply channel between the displacing piston and the fluid supply source. The checkvalve prevents the reverse flow of fluid into the pressurized fluid supply source when the displacing piston is translated.

A method of minimizing wear between two surfaces which are supported by a layer of pressurized fluid in accordance with the invention includes supplying pressurized fluid between the surface having a pressure magnitude which establishes a pressure balance between the surfaces less than 100% of a load between the surfaces, intermittently applying a pressure pulse to the fluid between the surfaces to increase the pressure between the surfaces from the pressure magnitude which establishes a pressure balance between the surfaces less than 100% of the load to a pressure greater than 100% of the load between the surfaces in a synchronism with a change in velocity of it least one of the surfaces. The pressure pulse is applied in response to a command to change velocity of at least one of the surfaces only when a relative velocity between the surfaces is less than a predetermined magnitude.

BRIEF DESCRIPTION OF THE DRAWINGS

The FIGURE illustrates an application of an intermittently assisted hydrostatic bearing in accordance with the present invention.

BEST MODE FOR CARRYING OUT THE INVENTION

The present invention as shown in the Figure is an intermittently assisted hydrostatic bearing 10 which is periodically assisted from a pressure balance less than 100% to attain greater than 100% pressure balance to further reduce friction of a rotating member at low rotational speeds. Application of the intermittently assisted hydrostatic bearing may be to a hydraulic motor as shown in the FIGURE, a pump or any other device requiring an intermittently assisted hydrostatic bearing from a pressure balance less than 100% to attain greater than 100% pressure balance.

Pressure balance, as described above, is a measure of the percentage of the load supported by the fluid film. At values of less than 100% pressure balance a rotating member must attain a relatively high rotational speed to create a hydrodynamic bearing to establish a pressurized fluid film upon which the rotating member floats. At values of pressure balance greater than 100%, a hydrostatic fluid film is created rapidly for supporting a rotatable member from a stopped condition through low rotational speeds. The pressure balance of the present invention is nominally set to value within the range of 93-97%, which permits the hydrostatic fluid film to be rapidly established during start up from a stopped condition by the application of a fluid pulse to create greater than 100% fluid balance.

As shown in the FIGURE, the assisted bearing 10 of the present invention is utilized in a hydraulic motor having a rotating member 12 which is the output shaft, and a stationary member 14 which is the housing. The motor also includes a bearing 16 which supports the output shaft 12 and shaft seals 18 which seal the internal structure of the motor against dirt and other foreign material.

The output shaft 12 is driven by a rotating drive structure 20 which is attached to shaft drive structure 22. Shaft drive structure 22 and stationary support member 14 have cooperating opposed bearing surfaces 24 which are the bearing surfaces of the assisted bearing 10 of the present invention. The rotation drive structure 20 is part of a conventional bent axis hydraulic motor.

A hydrostatic bearing is formed between the cooperating opposed bearing surfaces 24 from pressurized fluid 26, represented by arrows and supplied by a pressurized fluid supply source 28. As stated above, the pressurized fluid supply source maintains a pressure balance of less than 100% and preferably is in the range of 93 to 97%. Because of the pressure balance being less than 100%, the flow of leakage fluid is reduced which minimizes losses. The pressurized fluid 26 flows through a supply channel shown in the FIGURE as a first supply section 30, a second supply channel section 31, a third supply section 32 and a fourth supply section 34 to a point 36 between cooperating opposed bearing surfaces.

The hydrostatic bearing condition created at bearing surfaces 24 exists when the rotational speed of shaft drive structure 22 is less than the speed needed to create a hydrodynamic condition at bearing surfaces 24 when the pressure balance is set to a range between 93-97%. A fluid film condition is rapidly created at zero to low speeds when the pressure balance of the bearing is pulsed to a value greater than 100%. The fluid film created by the pulsing of the pressure balance to a value greater than 100% encircles the rotating member causing the rotating member to float or be lifted by the fluid film at zero to low rotational speeds.

the rotational speed of the output shaft 12 is sensed by a hydrostatic motor speed sensor 38, which provides a hydrostatic motor speed signal 40 when the rotational speed of the shaft is less than that needed to establish a hydrodynamic condition in the cooperating opposed bearing surfaces 24. The hydrostatic motor speed signal 40 is supplied to an AND gate 42 along with a position command signal 44. The position command signal 44 is generated by, for example, the pilot of an Advance Tactical Fighter (ATF) when a control surface of the ATF is to be moved to a new position thus causing the motor to change directions or increase speed. The position command signal is related to the desired amount of rotation of the output shaft 12.

The AND gate 42 generates a solenoid command signal 46 when the position command signal 44 and the hydrostatic motor speed signal 40 are present on both inputs of AND gate 42. Solenoid command signal 46 is supplied to an electric solenoid 48.

The electric solenoid 48 has a solenoid shaft 50 which is attached to a piston 52. Electric solenoid 48 translates the piston 52 to an extended position in response to a solenoid command signal 46 as illustrated. A first surface (bottom surface) 54 of the piston 52 serves as a wall of the third supply section 32 of the supply channel. The piston 52 is biased against the force created by the pressurized fluid flowing in the third suppply section 32 by a spring 56 and fluid provided by passage 58 to the top side 59 of the piston. Under normal operating conditions when the pressure balance of the surfaces 24 is slightly less than 100%, the generation of a solenoid command signal 46 causes the solenoid to be actuated to force the piston 52 to move downward to produce a pressure pulse which achieves a pressure balance greater than 100%.

The third supply section 32 of the supply channel has a checkvalve 60 which is placed between the displacing piston 52 and the pressurized fluid supply source 28. Checkvalve 60 prevents the reverse flow of fluid into the pressurized fluid supply source 28 when the displacing piston 52 is translated to create a pressure pulse.

The present invention operates as follows. Hydrostatic speed sensor 38 senses when the rotational speed of shaft 12 is less than the speed needed to establish a hydrodynamic condition in the bearing surfaces 24 at the pressure balance set for the bearings and generates a hydrostatic motor speed signal 40. Hydrostatic motor speed signal 40 is supplied to an input of AND gate 44. A position command signal 44 is supplied to a second input of AND gate 42. Position command signal 44 is generated when there is desired on the part of, for example, the pilot of an ATF to move the control surfaces to a new position or through automatic control without pilot intervention. Movement of the control surfaces is by the rotation of shaft 12 by the hydraulic motor 10.

When both position command signal 44 and hydrostatic motor speed signal 40 are present on the inputs of AND gate 42, the AND gate 42 generates a solenoid command signal 46, which is supplied to electric solenoid 48. Electric solenoid 48 in response to the solenoid command signal 46 translates the displacing piston 52 to an extended position.

The translated piston 52 causes an increase in pressure of the pressurized fluid flowing in the third supply section 32, and the fourth supply section and 34. The increase in pressure in the pressurized fluid causes the pressure balance of the hydrostatic bearing to increase to a valve greater than 100% thereby permitting a fluid film condition to be readily created at bearing surfaces 24 at the zero to low rotational speed range to the shaft 12.

Specifically, the increase in pressure in the pressurized fluid causes the pressurized fluid at point 36 between the cooperating opposed bearing surfaces 24 to create a fluid film upon which the shaft drive structure 22 floats thereby reducing friction at the cooperating opposed bearing surfaces 24 during the time at which the rotational speed of shaft 12 is less than that needed to create a hydrodynamic condition at the bearing surfaces 24. As long as the shaft speed sensor senses that the speed of the shaft 12 is less than that required to establish a hydrodynamic bearing, which varies depending upon the application, each position command signal 44 will cause a corresponding pulse to be produced. If the shaft 12 accelerates up to a velocity to sustain a hydrodynamic bearing, the solenoid command signal 46 is disabled by the hydrostatic speed signal 40 going low.

While the invention has been described in terms of its preferred embodiment, numerous modifications may be made thereto without departure from the spirit and scope of the invention. While an embodiment of the invention utilized in a hydraulic apparatus, such as a motor or pump, has been disclosed, it should be understood that the invention is applicable to numerous other applications. It is intended that all such modifications fall within the scope of the appended claims.

I claim:

1. An intermittently assisted hydrostatic bearing having opposed bearing surfaces with periodic assistance being provided to increase pressure balance from less than 100% to a pressure balance greater than 100% with the pressure balance being a measure of a percentage of an overall load supported by a fluid film, comprising:

a pressurized fluid supply source for supplying a pressurized fluid;

a supply channel, communicating with the pressurized fluid supply source, for supplying the pressurized fluid from the pressurized fluid supply source to a point between the opposed bearing surfaces; and pressure producing means coupled to the supply channel for intermittently applying a pressure pulse to the bearing surfaces in response to a pulse command signal to produce a pressure balance greater than 100% between the bearing surfaces by increasing the pressure of the pressurized fluid which is supplied to the point between the opposed bearing surfaces from a pressure produced by the pressurized fluid supply source, to establish a hydrodynamic bearing between the opposed bearing surfaces when the rotational speed of the rotating member is less than the rotational speed required for achieving a hydrodynamic bearing at the opposed bearing surfaces.

2. An intermittently assisted hydrostatic bearing in accordance with claim 1 wherein the pressure producing means comprises:

an electric solenoid having a moveable shaft which moves in response to the electric solenoid receiving to pulse command signal; and a piston attached to the shaft with the piston being moved by the shaft of the electric solenoid in response to the pulse command signal, and the piston upon movement displacing fluid in the supply channel which causes the increase in pressure in the pressurized fluid in the supply channel.

3. An intermittently assisted hydrostatic bearing in accordance with claim 2 wherein:

the pulse command signal is generated by a gate when a position command signal is present on one input of the gate with the position command signal being related to the position of the rotatable member, and a hydrostatic speed signal is simultaneously present at another input of the gate, the hydrostatic speed signal indicating that the rotational speed of the rotating member is less than the speed required for establishing a hydrodynamic condition at the cooperating opposed bearing surfaces when the intermittently assisted hydrostatic has a pressure balance less than 100%.

4. An intermittently assisted hydrostatic bearing in accordance with claim 3 wherein:

the gate is an AND gate.

5. An intermittently assisted hydrostatic bearing in accordance with claim 4 wherein:

a bottom surface of the displacing piston is a wall of the supply channel.

6. An intermittently assisted hydrostatic bearing in accordance with claim 5 wherein:

the piston is biased by biasing means to counteract the force created by the pressurized fluid pushing against the surface of the displacing piston which serves as a wall of the supply channel.

7. An intermittently assisted hydrostatic bearing in accordance with claim 6 wherein the biasing means comprises:
   a spring; and
   a supply of pressurized fluid from said pressurized fluid supply source with biasing force created by the spring and the supply of pressurized fluid counteracting the force of the pressurized fluid pushing on the bottom surface of the displacing piston which serves as a wall of the supply channel.

8. An intermittently assisted hydrostatic bearing in accordance with claim 7 further comprising:
   a checkvalve disposed in the supply channel between the displacing piston and the pressurized fluid supply source, wherein the checkvalve prevents reverse flow of fluid into the pressurized fluid supply source when the displacing piston is translated by the shaft of the electric solenoid to produce a pressure pulse to produce a pressure balance a greater than 100%.

9. An intermittently assisted hydrostatic bearing in accordance with claim 3 wherein:
   the position command signal is a function of a position of a flight control surface of an aircraft.

10. An intermittently assisted hydrostatic bearing in a hydraulic apparatus having a rotatable member and a stationary support member with the members having opposed bearing surfaces with periodic assistance being provided to increase pressure balance from less than 100% to a pressure balance greater than 100% with the pressure balance being a measure of a percentage of an overall load supported by a fluid film, comprising:
   a pressurized fluid supply source for supplying a pressurized fluid having a steady state pressure which has a magnitude when applied to the opposed bearing surfaces that establishes a pressure balance of less than 100% of a load between the surfaces;
   a supply channel, communicating with the pressurized fluid supply source, for supplying pressurized fluid from the pressurized fluid supply source to a point between the opposed bearing surfaces; and
   pressure producing means coupled to the supply channel for intermittently applying a pressure pulse to the bearing surfaces in response to a pulse command signal to produce a pressure balance greater than 100% by increasing the pressure of the pressurized fluid which is supplied to the point between the opposed bearing surfaces from the steady state pressure produced by the pressurized fluid supply to establish a hydrodynamic bearing between the opposed bearing surfaces when the rotational speed of the rotatable member is less than the rotational speed required for achieving a hydrodynamic bearing at the opposed bearing surfaces.

11. An intermittently assisted hydrostatic bearing in accordance with claim 10 wherein the pressure producing means comprises:
   an electric solenoid having a moveable shaft which moves in response to the electric solenoid receiving the pulse command signal; and
   a piston attached to the shaft with the piston being moved by the shaft of the electric solenoid in response to the pulse command signal, and the piston upon movement displacing fluid in the supply channel which causes an increase in pressure in the pressurized fluid in the supply channel.

12. An intermittently assisted hydrostatic bearing in accordance with claim 11 wherein:
   the pulse command signal is generated by a gate when a position command signal is present on one input of the gate, with the position command signal being related to the position of the rotatable member, and a hydrostatic speed signal is simultaneously present at another input of the gate, the hydrostatic speed signal indicating that the rotational speed of the rotating member is less than the speed required for establishing a hydrodynamic condition at the cooperating opposed bearing surfaces when the intermittently assisted hydrostatic has a pressure balance less than 100%.

13. An intermittently assisted hydrostatic bearing in accordance with claim 12 wherein:
   the gate is an AND gate.

14. An intermittently assisted hydrostatic bearing in accordance with claim 13 wherein:
   a bottom surface of the displacing piston is a wall of the supply channel.

15. An intermittently assisted hydrostatic bearing in accordance with claim 14 wherein:
   the piston is biased by biasing means to counteract the force created by the pressurized fluid pushing against the surface of the displacing piston which serves as a wall of the supply channel.

16. An intermittently assisted hydrostatic bearing in accordance with claim 15 wherein the biasing means comprises:
   a spring; and
   a supply of pressurized fluid from the pressurized fluid supply source with biasing force created by the spring and the supply of pressurized fluid counteracting the force of the pressurized fluid pushing on the bottom surface of the displacing piston which serves as a wall of the supply channel.

17. An intermittently assisted hydrostatic bearing in accordance with claim 16 further comprising:
   a checkvalve disposed in the supply channel between the displacing piston and the pressurized fluid supply source, wherein the checkvalve prevents reverse flow of fluid into the pressurized supply source when the displacing piston is translated by the shaft of the electric solenoid to produce a pressure pulse to produce a pressure balance greater than 100%.

18. An intermittently assisted hydrostatic bearing in accordance with claim 12 wherein:
   the position command signal is a function of a desired position of a flight control surface of an aircraft.

19. An intermittently assisted hydrostatic bearing in accordance with claim 10 wherein:
   the steady state pressure is sufficient to establish a pressure balance of 93 to 97% of the load supported by the bearing surfaces.

20. A method of minimizing wear between two surfaces which are supported by a layer of pressurized fluid comprising:
   supplying pressurized fluid between the surfaces having a steady state pressure magnitude which establishes a pressure balance between the surfaces less than 100% of a load between the surfaces; and
   intermittently applying a pressure pulse to the fluid between the surfaces to increase the pressure between the surfaces from the steady state pressure magnitude which establishes a pressure balance between the surface less than 100% of the load to a pressure greater than 100% of the load between the surfaces in synchronism with a change in velocity of at least one of the surfaces.

21. A method in accordance with claim 20 wherein: the pressure pulse is applied in response to a command to change velocity of at least one of the surfaces only when a relative velocity between the surfaces is less than a predetermined magnitude.

* * * * *